P. B. DAHL.
PIANO SHIPPING CASE.
APPLICATION FILED APR. 22, 1907.
910,792.
Patented Jan. 26, 1909.
2 SHEETS—SHEET 1.
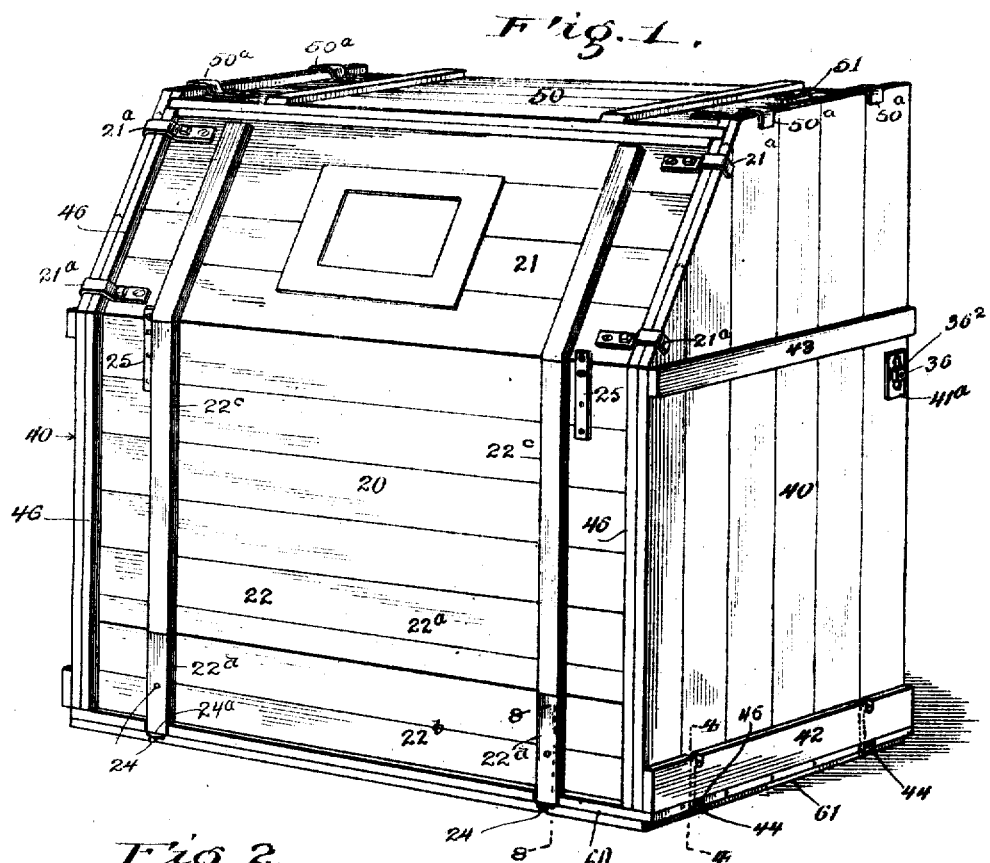
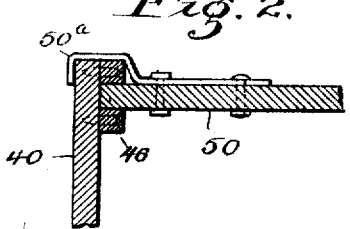
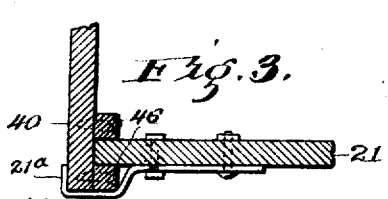
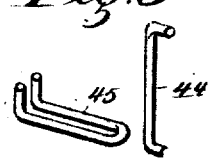
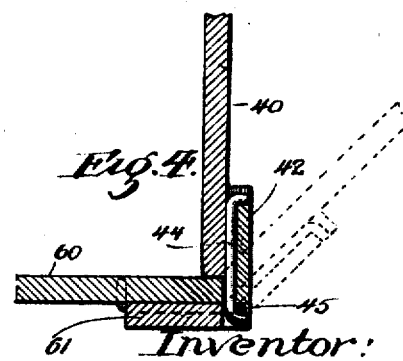
Witnesses:
Inventor:
Peter B. Dahl,
by Charles O. Shurvey,
his Atty P. B. DAHL.
PIANO SHIPPING CASE.
APPLICATION FILED APR. 22, 1907.
910,792.
Patented Jan. 26, 1909.
3 SHEETS—SHEET 2.
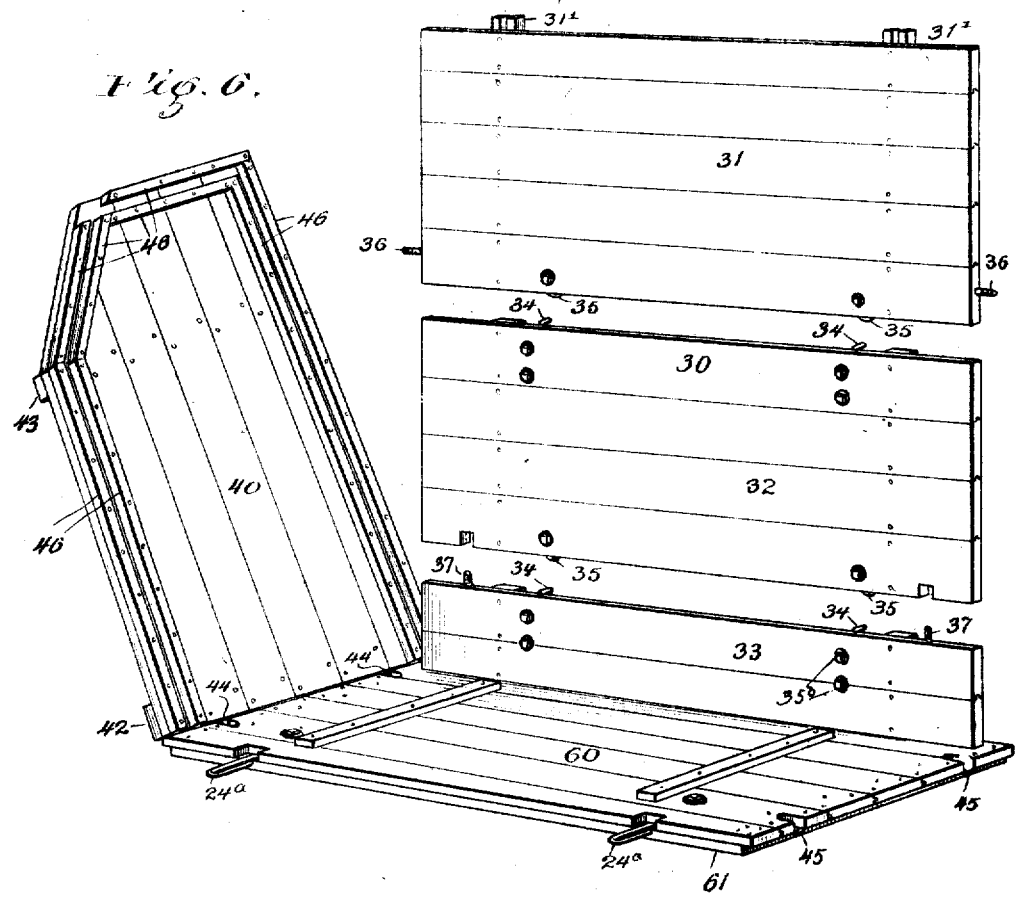
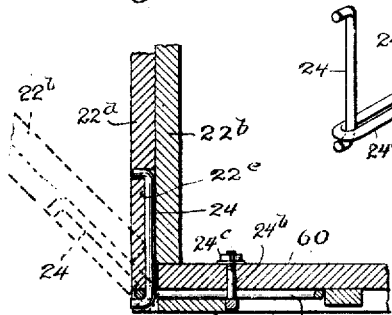
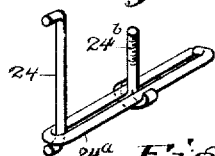
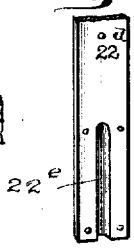
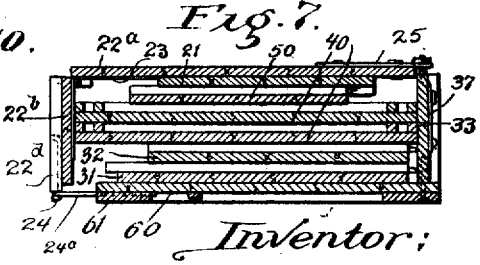
Witnesses:
Chas L. Martin
N. Roach
Inventor:
Peter B. Dahl,
by Charles O. Shurvey,
his Atty.

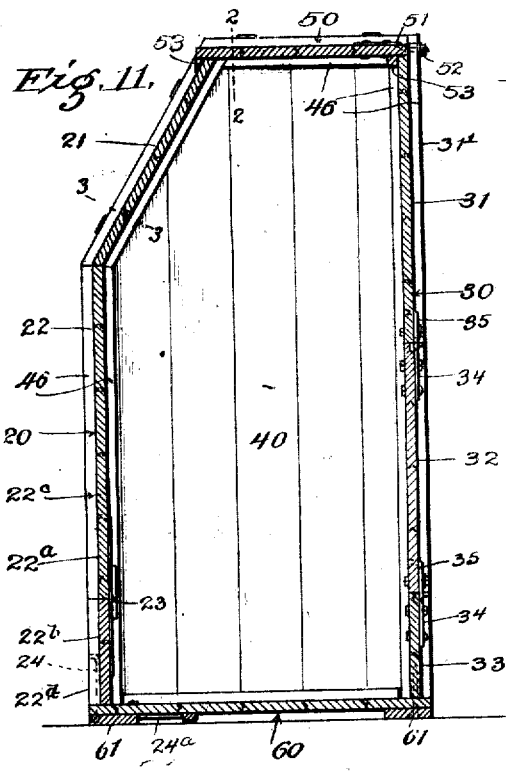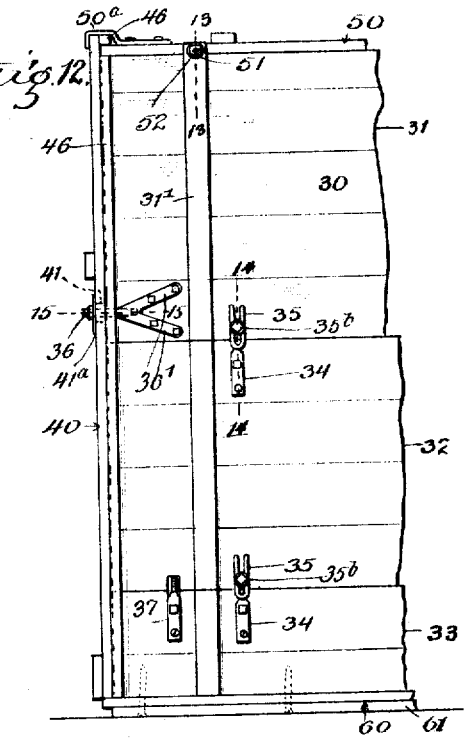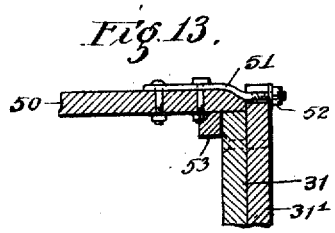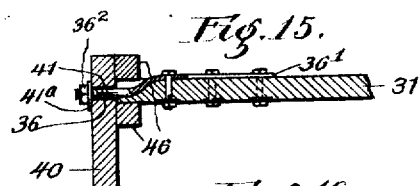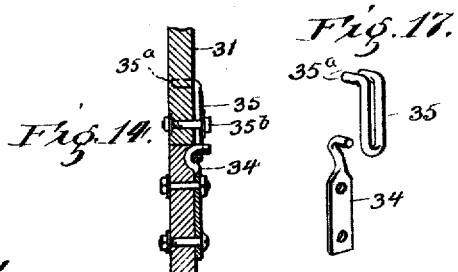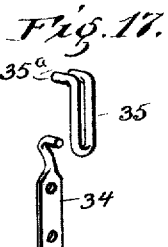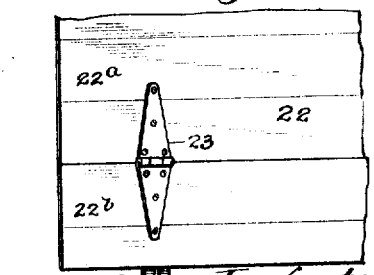

UNITED STATES PATENT OFFICE.

PETER B. DAHL, OF CHICAGO, ILLINOIS.

PIANO-SHIPPING CASE.

No. 910,792.

Specification of Letters Patent.

Patented Jan. 26, 1909.

Application filed April 22, 1907. Serial No. 369,433.

*To all whom it may concern:*

Be it known that I, PETER B. DAHL, a citizen of the United States, residing in Chicago, in the county of Cook and State of Illinois, have invented certain new and useful Improvements in Piano-Shipping Cases, of which the following is a full, clear, and exact description.

My invention relates to certain new and useful improvements in piano shipping cases, and more particularly to improvements in cases of this class that may be "knocked down" for reshipment, that is to say shipment back to the owner of the case, after the piano has been removed therefrom.

The difficulty which has been encountered in "knock down" cases heretofore, namely the production of a case which would stand the rough usage to which they are frequently put, has been practically overcome, in my improved case.

One of the objects of this invention is to produce a case which is easily assembled or taken apart, and which when "knocked down" will occupy very little space.

To such end this invention consists in certain novel features of construction and arrangement, a description of which will be found in the following specification and the essential features of which will be more definitely pointed out in the claims appended thereto.

The invention is clearly illustrated by means of drawings furnished herewith, of which—

Figure 1 is a perspective view of the complete case assembled for shipment. Fig. 2 is a detail cross section taken on the line 2—2 Fig. 11. Fig. 3 is a similar section taken on line 3—3 Fig. 11. Fig. 4 is a similar section taken on line 4—4 Fig. 1. Fig. 5 is a perspective view of a pivot connection between the sides and bottom. Fig. 6 is a perspective view of a part of the case partially assembled. Fig. 7 is a cross section of the case in its "knocked down" condition. Fig. 8 is a detail cross section taken on line 8—8 Fig. 1. Fig. 9 is a perspective view of a pivot connection between the lower front piece and the bottom. Fig. 10 is a similar view of a fragment of a cleat. Fig. 11, is a vertical cross section of the case in its assembled condition. Fig. 12, is a rear view of a portion of the case. Fig. 13, is a detail vertical cross section taken on the line 13—13—Fig. 12. Fig. 14 is a detail vertical section taken on the line 14—14 Fig. 12. Fig. 15 is a detail horizontal section taken on the line 15—15 Fig. 12. Fig. 16 is a rear perspective view of a fragment the lower front section of the case, and Fig. 17 is a perspective view of a pivot connection that is used between the various sections of the back.

As shown in these drawings, 20 represents the entire front of the case, 30, the back, 40, the sides, 50 the top and 60 the bottom. These various parts are preferably composed of boards, nailed or screwed upon reinforcing strips. The front comprises top and bottom sections 21, 22, and the back comprises top, middle and bottom sections 31, 32, 33. The bottom back section 33, is rigidly secured to the bottom 60, and is reinforced by cleats upon its rear face. The bottom is made with a reinforcing frame 61, upon its lower side to strengthen the same.

The bottom front section 22, is preferably made in two pieces $22^a$, $22^b$, hinged together by means of hinges 23, and each piece is reinforced by cleats $22^c$, $22^d$ upon its front face. The entire lower section 22, is pivotally and removably connected to the bottom 60, by means of suitable connecting devices, each of which comprises a hook member 24 fast upon the section $22^b$, (see Figs. 8 to 11) and loops $24^a$ secured in the bottom 60. The loops $24^a$ are secured to the underside of the bottom by T hooks $24^b$, and nuts $24^c$. The hook members 24, have right angle bends at their ends, one bend of which engages the loop $24^a$. The body portion of the hooks are confined in grooves $22^e$, formed in the cleats $22^d$ and the upper bends of the hooks extend out through holes in the cleats. This mechanism provides a simple connection between the front and bottom and which permits of the ready removal of the front from, or its replacement upon the bottom. The front edge of the bottom is notched to receive the lower ends of the cleats $22^d$, which extend down to the loops, $24^a$.

The upper front section 21, extends from the upper edge of the lower section 22, to the top of the case and lies at an angle to the lower section, as is common in the ordinary piano shipping case. A number of hooks $21^a$ are secured upon the section 21, which hooks project over and engage the side sections 40. The top section 50, is also provided with hooks $50^a$ that engage the side sections 40. The hooks $21^a$—$50^a$ hold the side sections in place when the case is assembled, and should therefore be of strong and substantial construction. The back 30, is also cleated upon its rear face and the three sections thereof are connected together by means of hooks and staples 34, 35, (see Fig. 14, 17). Said hooks are bolted or otherwise secured near the upper edges of the sections 32—33, and the staples are secured near the lower edges of the sections 31—32 and are arranged to engage the hooks 34. As shown the staples 35 are formed with right angle bends 35ª which are driven into the wood, and said staples are further secured thereto by means of bolts and nuts 35ᵇ. Bolts 36 are provided upon the section 31, to clamp the back to the side sections and said bolts contain bifurcated strap portions 36¹ by which they are secured to the back. The side sections contain slots 41, to receive the bolts 36 and slotted face plates 41ª, are secured to the outer sides of the side sections, against which bear the nuts 36² of the bolts 36. The top 50 and the back 30 are connected by strap bolts 51, and nuts 52, the bolts being secured upon the top and extending out through notches in the upper ends of the cleats 31¹ of the upper back section 31. Strap bolts 37 are secured to the bottom back section 33, and are arranged to engage perforated straps 25, upon the lower front section 22 when the case is folded for reshipment.

The side sections contain reinforcing cleats 42, 43 and are removably and pivotally connected to the bottom by means of hooks and staples 44, 45 (see Figs. 4 and 5), the hooks being substantially like the hooks 24, that pivotally connect the front with the bottom and the staples 45 are substantially like the staples 35, of the back sections and are confined between the reinforcing cleat 61, and the bottom edge of the bottom boards, the right angle bends being driven into the bottom boards. The hooks 44, 45 are secured in place between the cleats 42, and the face of the side sections 40, and their upper bends lie in notches formed in said cleats 42.

The inner face of each side section is provided with strips 46, that are arranged in pairs to form grooves to receive the ends of the front, top, and back sections. The top 50, and upper front section 21, are slidable in the grooves, while the lower front section, and back are confined in the grooves against longitudinal movement. The top 50, has two cleats 53, upon its under side which engage with the upper front section and back.

The case is assembled as follows:—Referring to Fig. 6, the base, which comprises the bottom 60 and lower back section 33, is first laid down upon the floor, and the loops 24ª, pushed back into place and bolted down. The piano may then be placed upon the base, and screwed to the back section. The middle and top back sections are then hooked upon the bottom back section. The lower front is then put in place by hooking the hooks 24 into the loops 24ª and bringing it into an upright position. It is to be understood that in order to bring the hooks 24 into engagement with the loops 24ª, the lower section 22ᵇ, must be first held at an angle to the bottom so that the hooks may enter the loops. The sides may now be put in place by hooking them upon the staples 45 and swinging them up and against the front and back pieces, the latter entering and becoming confined in the grooves between the strips 46. The sides and back are then clamped together by the bolts and nuts 36, 36², the top front piece 21, is slid down into place between the strips 46, after which the top piece 50 is slid into place from front to back. The top is then bolted to the top back section by the bolt and nut connection 51, 52 and the case is now ready for shipment.

In taking the case apart for reshipment the reverse order of procedure is followed, beginning with the loosening of the bolt and nut connections 51, 52. The loops 24ª are then drawn out to their fullest extent and the various sections laid upon the bottom 60, the bottom piece of the front section being hooked upon the loops 24ª and the section 22ª laid down upon the intermediate sections and bolted down upon the bottom back section by means of the straps 25 and bolts 37.

This construction is very substantial, is easily assembled and readily taken apart. When packing a piano in an ordinary case, an hour's time or more is taken to complete the work, but my case can be assembled or taken apart in a very few minutes. The pivot connections between the parts have been designed with a view of making a case which is practically indestructible, from ordinary handling and usage and may be used from time to time until completely worn out. These connecting devices are preferably constructed of wrought iron, and are secured to the case in a very substantial manner, so as to guard against accidental removal while in use. Those which are embedded between the walls and the reinforcing cleats are especially well secured in place, as the entire cleat must first be torn off before the hooks can come loose.

I am aware that various alterations and modifications of this construction are possible without departing from the spirit of this invention and I not desire therefore, to limit myself to the exact construction shown and described.

I claim as new and desire to secure by Letters Patent.

1. A piano shipping case comprising a base having the lower portion of the back rigidly attached thereto, a removable upper back section, removable front section comprising an upper and a lower piece hinged together, removable back and top sections, side sections removably pivoted to the base, and arranged to be swung up against the front and back sections, the top piece being slidably connected to the side sections and connecting devices, upon the upper back piece and lower back piece, the top and the front section are constructed and arranged to lock the top section to the back section when the case is assembled and to lock said front section to the base when the case is knocked down.

2. A knock down piano shipping case comprising a base, removable front, back, top and side sections, constructed and arranged to be assembled upon said base, a pivotal connection between the front and base, comprising hooks upon the front piece adjustable loops upon the base arranged to be removably connected to said hooks and locking devices between the top and back sections, said base being arranged to receive the back, top and side sections, when the case is knocked down, and said hooks, adjustable loops, and locking devices forming the sole means of securing all of the sections to the base when in a knocked down condition.

3. A knock down piano shipping case, comprising a base having a portion of the back rigidly attached thereto, other back sections removably secured to said first named back section, front sections, the lower one of which is approximately as wide as the lower back section, adjustable pivotal connecting devices between said lower front section and the base, constructed and arranged to permit the front section to be detached from the base, side sections removably pivoted upon the base, a top section, connections between the top and side sections and locking means between the top and back section, said top, back and side sections being arranged to be confined between the base and front section when knocked down, and said adjustable pivotal connecting devices and locking means forming the sole means for locking the case together when in its knocked down condition.

4. A piano shipping case comprising a base, side sections removably pivoted thereto, guide grooves upon said side sections, back sections seated in said grooves, and removably connected to the base, a front section seated in said grooves, and removably pivoted to said base, said side and front sections being pivoted to swing outward from the body of the case, a top, slidable in said grooves, connecting means between the top and sides and locking means between the top and back sections arranged to secure all of the sections in place upon the base.

5. In a knock down piano shipping case, a hinge connection between the base and one of the other sections, comprising a wrought iron loop bolted or otherwise secured to the base, said loop being adjustable longitudinally of itself and in the plane of the base, and a wrought iron hook, secured to said other section and adapted to be hooked into said loop to connect the parts together or unhooked therefrom to separate the parts.

6. In a knock down piano shipping case, a hinge connection between the base and one of the other sections, comprising, the wrought iron loop, the T hook engaging both legs of the loop and the nut adjustably connecting said loop to the base, the wrought iron hook, having right angle bends upon both of its ends, one bend of which is arranged to be hooked upon the loop and the other bend of which extends into the material of the section, said loop being adjustable in the plane of the base, substantially as and for the purpose set forth.

7. In a knock down piano shipping case the combination of a base, removable back sections, hook and loop connections between the sections of the back, removable front sections, removable side sections arranged to be hooked upon the base, and swung up against the front and back sections, bolt connections between the back and side sections, guide grooves upon said side sections for the other section that meet said side sections, a top front section, and a top section slidable in said grooves, hooks upon said top front and top sections engaging the side sections, and bolt and nut connections between the top and back sections arranged to secure all of the parts together.

8. In a piano shipping case the combination of a base, side, back and top sections removably secured thereupon, and a two part front section removably hinged to the base to swing down and away from the body of the case, the two parts of the front section being hinged together to swing down upon the sides, top and back sections when the case is knocked down.

9. In a piano shipping case the combination of a base, having a portion of the back rigidly secured thereto, of side, back and top sections removably secured thereupon, and a two part front section removably hinged to the base to swing down and away from the body of the case, the two parts of the front section being hinged together to swing down upon the sides, top and back sections when the case is knocked down, and locking devices between the front and lower back sections arranged to lock the parts in their knocked down condition.

In witness whereof I have executed the above application for Letters Patent this 18th day of April, 1907.

PETER B. DAHL.

Witnesses:
CHARLES O. SHERVEY,
CLARAH MARTIN.